United States Patent
Laboda (10) Patent No.: US 8,439,618 B2
(45) Date of Patent: May 14, 2013

(54) FASTENER HAVING CONTROLLABLY VARIABLE PRELOAD AND METHOD OF FORMING SAME

(75) Inventor: Daniel J. Laboda, Niles, MI (US)

(73) Assignee: Honeywell International Inc., Morristown, NJ (US)

(*) Notice: Subject to any disclaimer, the term of this patent is extended or adjusted under 35 U.S.C. 154(b) by 295 days.

(21) Appl. No.: 13/024,892

(22) Filed: Feb. 10, 2011

(65) Prior Publication Data

US 2011/0188965 A1  Aug. 4, 2011

Related U.S. Application Data

(62) Division of application No. 11/698,124, filed on Jan. 26, 2007, now Pat. No. 7,896,600.

(60) Provisional application No. 60/815,587, filed on Jun. 22, 2006.

(51) Int. Cl.
  *F16B 35/06* (2006.01)
  *F16L 15/00* (2006.01)

(52) U.S. Cl.
  USPC ............ 411/399; 285/187; 285/390; 403/30

(58) Field of Classification Search .................. 411/399; 285/92, 219, 390, 187, 381.1; 403/28, 30
  See application file for complete search history.

(56) References Cited

U.S. PATENT DOCUMENTS

| | | | |
|---|---|---|---|
| 2,942,895 A | 6/1960 | Lyon | |
| 3,106,413 A | 10/1963 | Hamlin et al. | |
| 3,145,362 A | 8/1964 | Lowell | |
| 3,395,934 A | 8/1968 | Capistrano et al. | |
| 3,611,881 A | 10/1971 | Little | |
| 3,632,143 A | 1/1972 | Lessmann | |
| 3,702,707 A | 11/1972 | Rosan | |
| 3,730,563 A | 5/1973 | Hanback et al. | |
| 4,161,967 A | 7/1979 | Sprague | |
| 4,191,486 A * | 3/1980 | Pelton | 403/28 |
| 4,299,018 A | 11/1981 | Bickerstaff et al. | |
| 4,553,776 A | 11/1985 | Dodd | |
| 4,854,613 A | 8/1989 | Reece et al. | |

(Continued)

FOREIGN PATENT DOCUMENTS

| | | |
|---|---|---|
| GB | 693317 A | 6/1953 |
| GB | 2218174 A | 8/1989 |

*Primary Examiner* — Flemming Saether
(74) *Attorney, Agent, or Firm* — Ingrassia Fisher & Lorenz, P.C.

(57) ABSTRACT

A method of forming a fastener that includes an axial centerline, a seating surface angled with respect to the axial centerline at an angle α and adapted to contact an angled seat of a bore, the smallest diameter of the seating surface being designated a seating diameter, and a threaded connecting portion for engaging a threaded portion of a bore, the threaded connecting portion including a point designated a proximal contact point, the distance from the seating diameter to the proximal contact point in the direction of the axial centerline being the clamped length of the fastener, the method including steps of determining a value for at least a first one of angle α, seating diameter D and clamped length L, solving the equation α=arctan (D/(2L)) to calculate at least a second one of angle α, seating diameter D and clamped length L, and forming a fastener based on the determined and calculated values. Also a fastener and fastener system based on the method.

3 Claims, 6 Drawing Sheets

U.S. PATENT DOCUMENTS

| | | |
|---|---|---|
| 4,907,749 A | 3/1990 | Bennett et al. |
| 4,934,742 A | 6/1990 | Williamson |
| 4,934,857 A | 6/1990 | Swanson |
| 5,533,764 A | 7/1996 | Williamson |
| 5,573,285 A | 11/1996 | Ridenour |
| 6,171,009 B1 | 1/2001 | Wright |
| 6,363,995 B1 | 4/2002 | Baranzke |
| 6,375,232 B1 | 4/2002 | Robinson |

\* cited by examiner

FASTENER HAVING CONTROLLABLY VARIABLE PRELOAD AND METHOD OF FORMING SAME

CROSS-REFERENCE TO RELATED APPLICATIONS

The present application claims the benefit of U.S. Provisional Patent Application No. 60/815,587, filed Jun. 22, 2006, the entire contents of which are hereby incorporated by reference, and is a divisional application of U.S. patent application Ser. No. 11/698,124, filed Jan. 26, 2007, now U.S. Pat. No. 7,896,600.

FIELD OF THE INVENTION

The present invention is directed toward a method of forming a fastener such that preload on the fastener varies in a desired manner with changing temperature and to a fastener formed by this method, and, more specifically, toward a method of selecting a relationship between various angles and dimensions of a fastener so that preload on the fastener will vary in a desired manner with changing temperature and toward a fastener having the selected relationship.

BACKGROUND OF THE INVENTION

Figure 6:
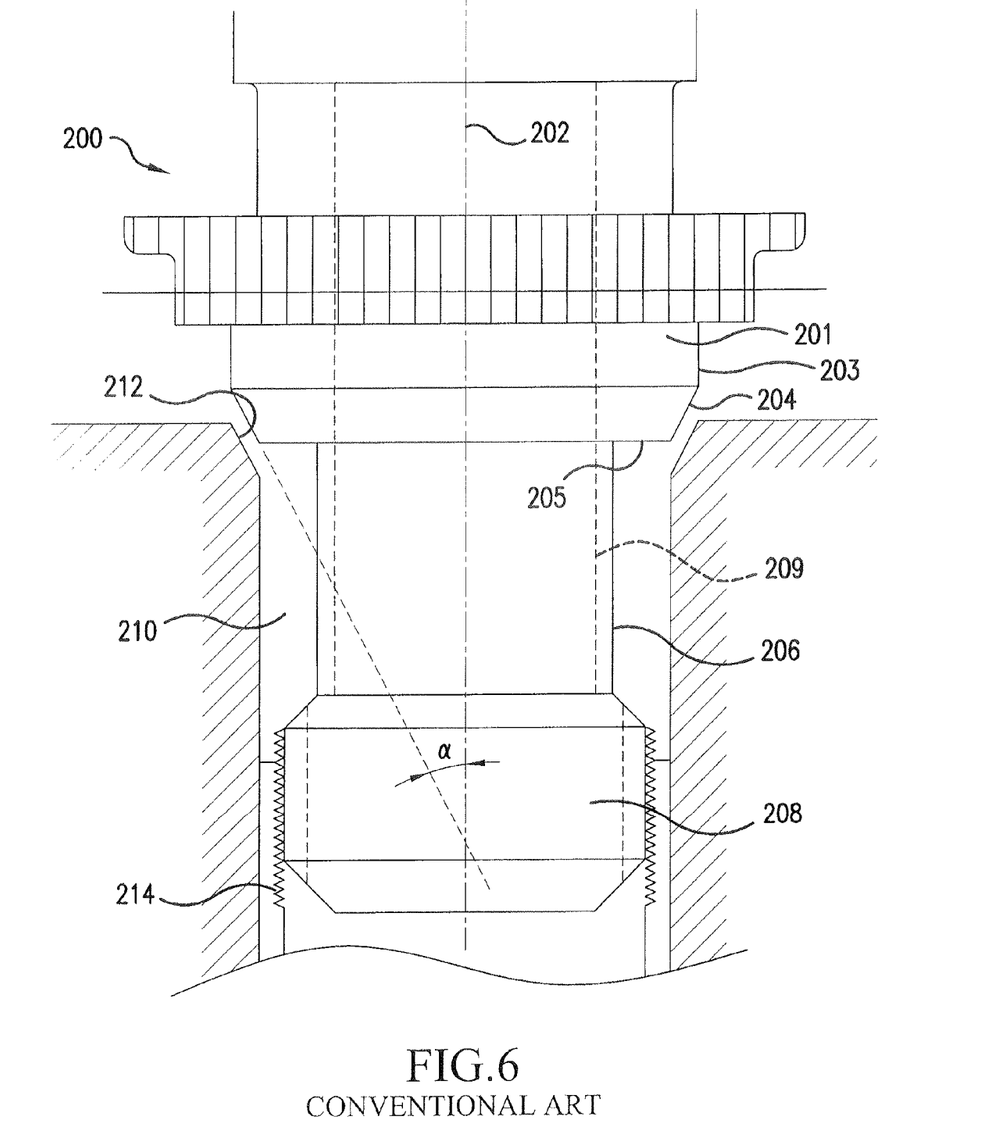
FIG. 6 is a side elevational view of a convention AS1986 fluid fitting as it is inserted into a bore.

"Rosan" style or AS1986 fittings and similar fittings are commonly used in aerospace applications, to connect fluid lines to a block or body, for example. A first end of the fitting is attached to a fluid line and the second end is placed into a bore in the body and secured thereto in a well-known manner. As illustrated in FIG. 6, these fittings may take the form of a fitting 200 having a main body portion 201 having an axial centerline 202, a seating surface 204 angled at an angle $\alpha$ relative to axial centerline 202 and extending between a sidewall 203 and a shoulder 205, a neck 206 projecting from shoulder 205, and a threaded end portion 208. Such fittings also generally include an internal bore 209 for carrying a fluid and an O-ring (not shown) surrounding at least a portion of neck 206 to better seal the fitting.

The fittings may be placed into bores, such as bore 210, which includes a bore seat 212 and a threaded portion 214 complementary to the threads of the threaded end portion 208 of fitting 200. In use, the threaded end portion 208 of the fitting is inserted into bore 210 until it reaches threaded portion 214 of bore 210. Fitting 200 is then rotated to threadedly engage threaded end portion 208 and bore threads 214 and draw fitting 200 into bore 210. This action moves seating surface 204 of fitting 200 toward and ultimately into contact with bore seat 212. After seating surface 204 contacts bore seat 212, a user continues to apply torque to fitting 200 until a desired preload is attained. Fluid fittings having this form are generally known; fittings without internal bores could alternately be provided to perform connecting or joining functions without carrying a fluid. As used herein, the term "fastener" includes versions of the fitting described above both with and without internal bores.

The bore into which a fastener is inserted is frequently formed in a material (such as aluminum) different than the material used to form the fastener (such as titanium). These materials have different coefficients of thermal expansion, and thus the preload on current fasteners tends to decrease with increasing temperature due to axial slip at the angled seating surface. A reduced preload at elevated operating temperatures and/or repeated changes to the preload may lead to premature fatigue failure of the fitting or the threads. It might be possible to address this problem by carefully matching the thermal properties of the fastener and the block. However, for various reasons, including cost and performance, this is often not possible or practical. It would therefore be desirable to control the preload on a fastener so that the preload remains substantially constant with changing temperature or varies with changing temperature in a desired manner.

SUMMARY OF THE INVENTION

These and other problems are addressed by the present invention which comprises, in a first embodiment, a method of forming a fastener having an axial centerline and a seating surface angled with respect to the axial centerline at an angle $\alpha$ that is adapted to contact an angled seat of a bore. The smallest diameter of the seating surface may be called the seating diameter. The fastener also includes a threaded connecting portion for engaging a threaded portion of a bore, and this connecting portion includes a point designated a proximal contact point. The distance from the seating diameter to the proximal contact point in the direction of the axial centerline is designated the clamped length of the fastener. The method includes steps of determining a value for at least a first one of angle $\alpha$, seating diameter D and clamped length L, solving the equation $\alpha=\arctan(D/(2L))$ to calculate at least a second one of angle $\alpha$, seating diameter D and clamped length L, and forming a fastener based on the determined and calculated values.

Another aspect of the invention comprises a fastener system that includes a block and a fastener. The block includes a bore having a diameter D, an angled seat at one end of the bore, and a threaded portion. The fastener has an axial centerline and a seating surface angled with respect to the axial centerline at an angle $\alpha$, and the seating surface contacts the angled seat of the block. The fastener also includes a threaded connecting portion spaced from the seating surface and threadedly engaging the threaded bore portion, and a clamped portion that is the portion of the fastener between but not directly engaging the bore threaded portion and the bore angle seat, the clamped portion having a length L. In this fastener system, $\alpha$ is greater than or equal to $\arctan(D/(2L))$ when a coefficient of thermal expansion of the block is greater than a coefficient of thermal expansion of the fastener and wherein $\alpha$ is less than or equal to $\arctan(D/(2L))$ when a coefficient of thermal expansion of the block is less than a coefficient of thermal expansion of the fastener.

A further aspect of the invention comprises a fastener that has an axial centerline and a seating surface angled with respect to the axial centerline at an angle $\alpha$ and adapted to contact an angled seat of a bore, where the smallest diameter of the seating surface comprises a seating diameter. The fastener also includes a threaded connecting portion for engaging a threaded portion of a bore, the threaded connecting portion including a point designated a proximal contact point, the distance from the seating diameter to the proximal contact point in the direction of the axial centerline comprising a clamped length of the fastener. In this fastener $\alpha$ is equal to $\arctan(D/(2L))$.

DETAILED DESCRIPTION

Figure 1:
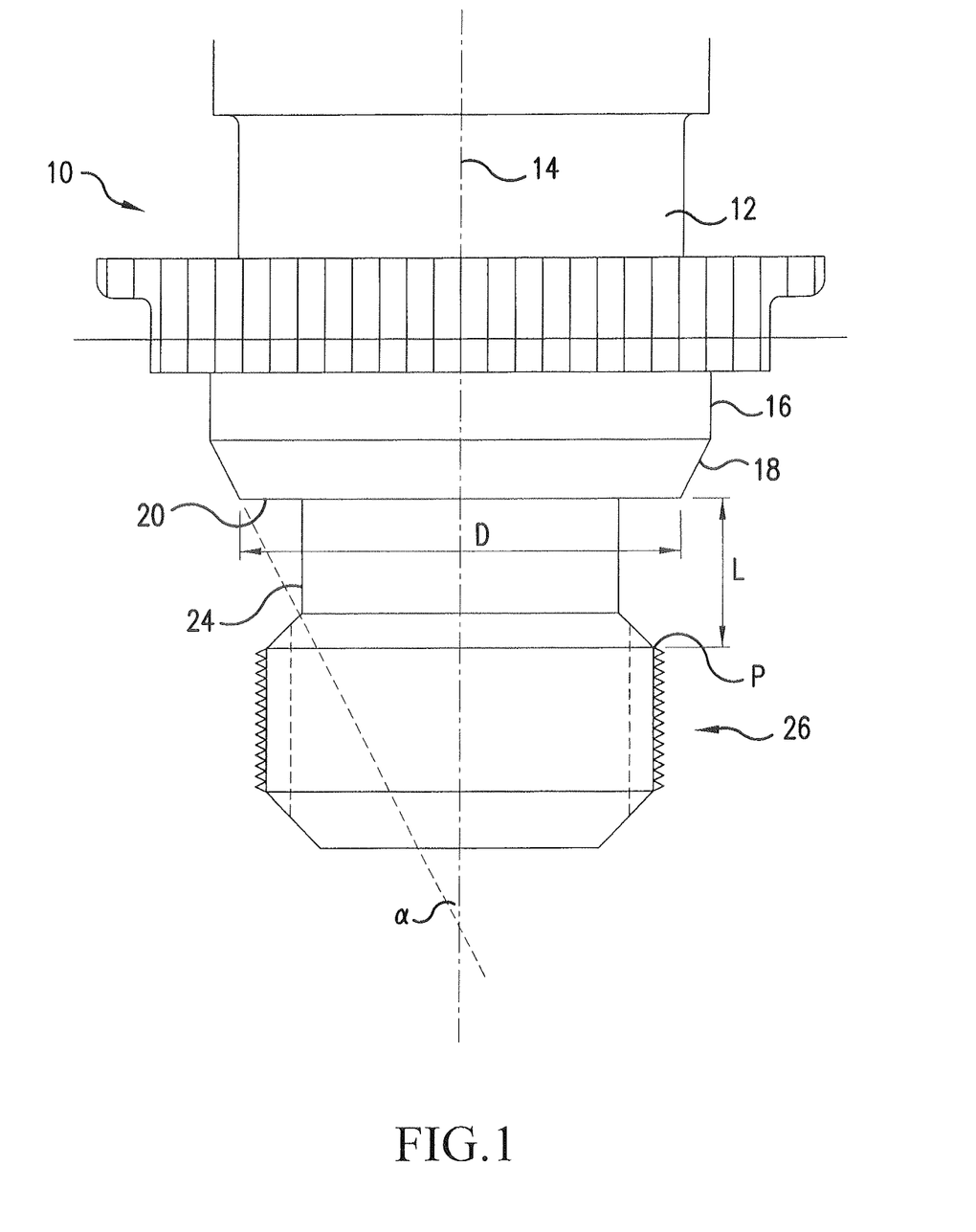
FIG. 1 is a side elevational view of a first fastener according to an embodiment of the present invention.
Figure 2:
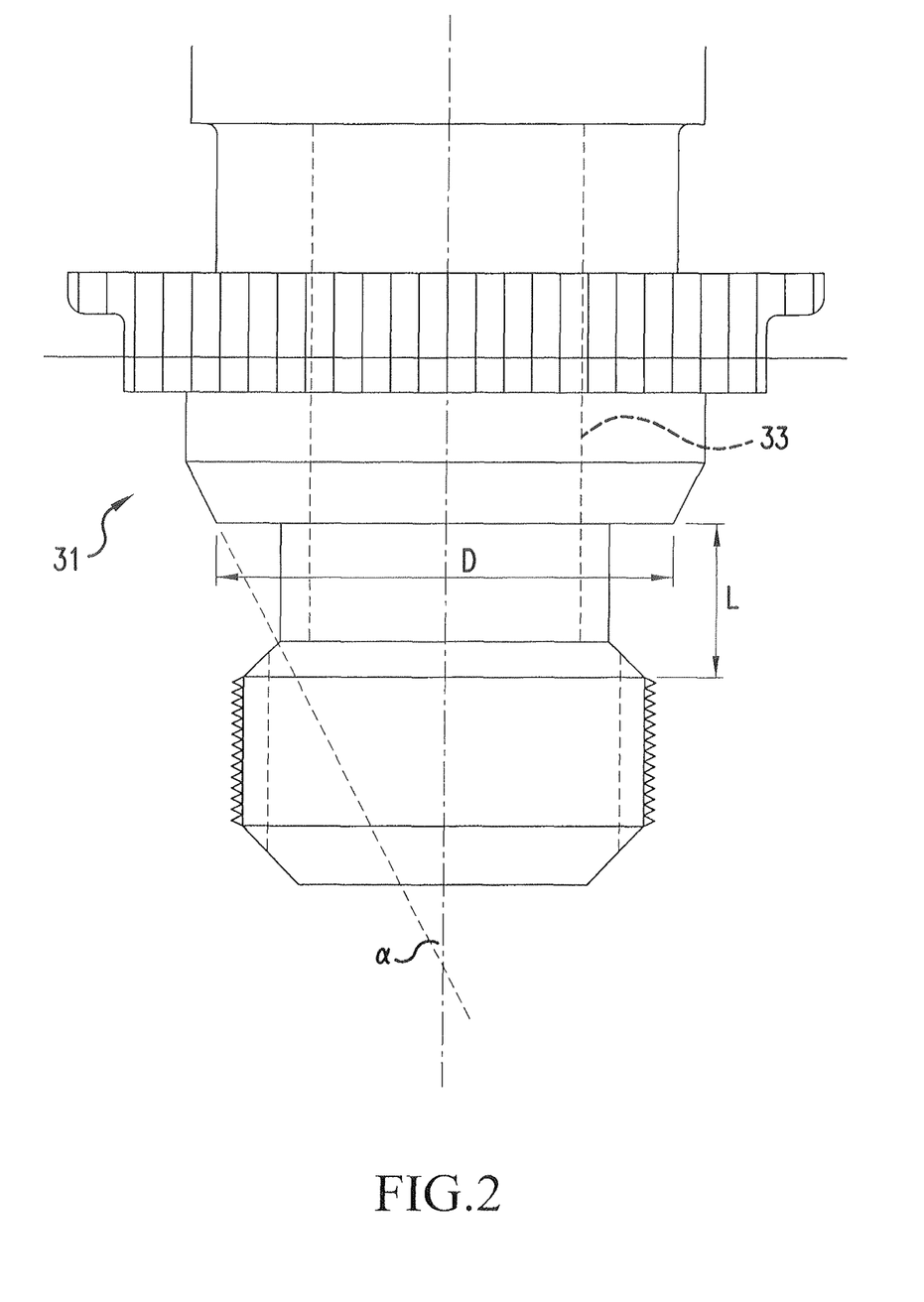
FIG. 2 is side elevational view of a second fastener according to an embodiment of the present invention that includes an internal fluid passage.

Referring now to the drawings, wherein the showings are for purposes of illustrating preferred embodiments of the invention only and not for the purpose of limiting same, and wherein the showings are not necessarily to scale, FIG. 1 illustrates a fastener 10 having a main body portion 12, a centerline 14, a sidewall 16, and an angled seating wall 18 extending from sidewall 16 to a shoulder 20 and making an angle $\alpha$ of about 20 degrees with centerline 14. A neck portion 24 having a diameter less than the diameter of main body portion 12 extends from shoulder 20 and terminates at a threaded end portion 26. A similar fastener 32 is illustrated in FIG. 2 and is substantially identical to fastener 10 of FIG. 1 except that fastener 32 includes a central bore 33 for allowing the flow of fluid therethrough. When fasteners are used for carrying fluid, they will generally include an O-ring (not shown) surrounding the neck portion of the fastener for improved sealing.

Referring again to FIG. 1, two dimensions of fastener 10 are referred to as a "seating diameter" D and a "clamped length" L, and a particular location on threaded end portion 26 is referred to as the "proximal contact point" P. The seating diameter is the diameter of fitting 10 at the narrowest point on seating wall 18 that is intended to make contact with the seat of a bore. The proximal contact point P is the part of threaded end portion 26 closest to shoulder 20 that is intended to engage the threaded portion of a bore. Portions of threaded end portion 26 closer to shoulder 20 will not engage the threaded portion of a bore. The circle (not shown) on the seating wall 18 that includes both ends of the seating diameter may be referred to herein as the "seating circumference." The clamped length L is the distance between the plane of the seating circumference and proximal contact point P in the direction of centerline 14.

Figure 3:
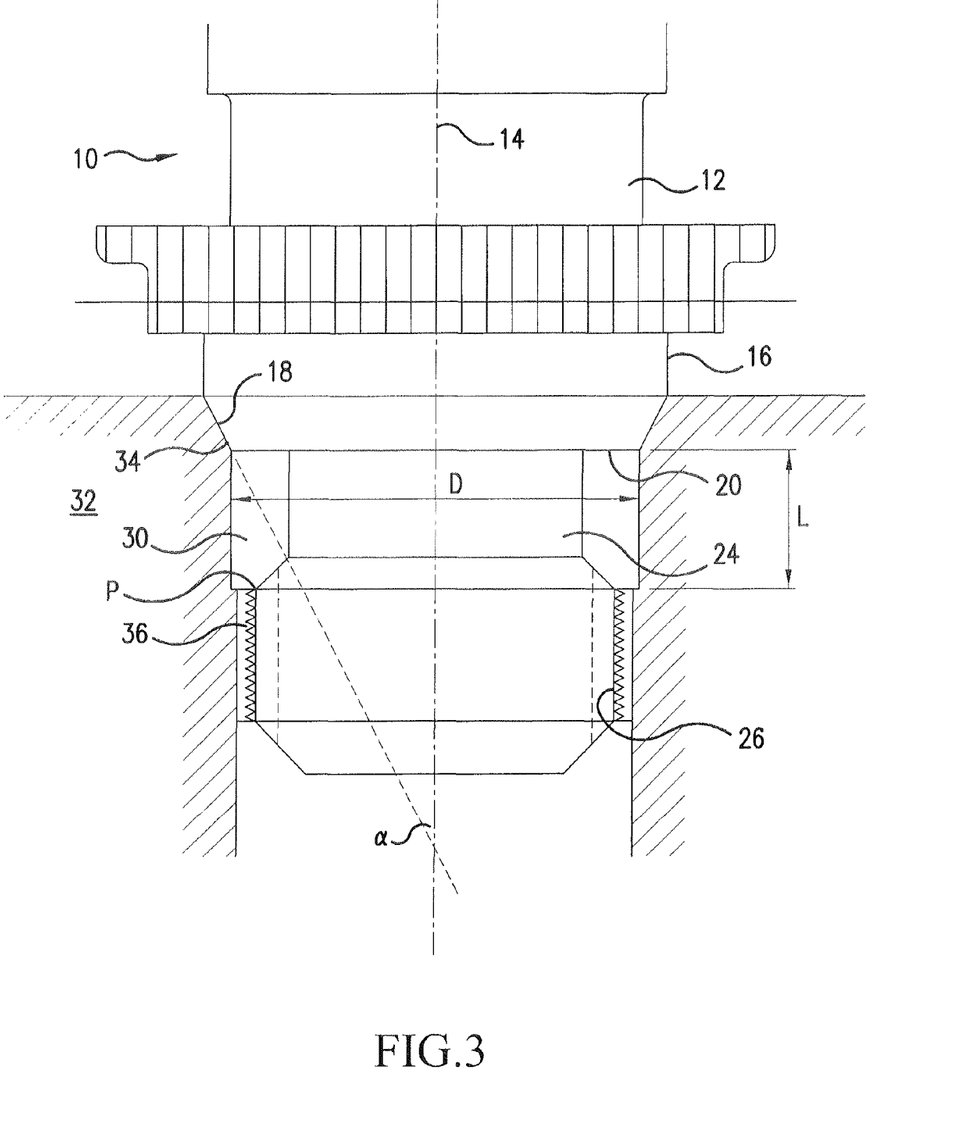
FIG. 3 is side elevational view, partly in section, of the fastener of FIG. 1 mounted in a first bore.

Fastener 10 is configured for use in a bore such as bore 30 in a block 32 as illustrated in the fastening system of FIG. 3. Bore 30 includes an angled seat 34 and a threaded portion 36. While threaded portion 36 of bore 30 is shown as comprising a female thread and threaded portion 26 of fastener 10 has a male thread, it is noted that these thread types could be reversed without exceeding the scope of the invention.

The seating diameter will frequently be the diameter of seating wall 18 at shoulder 20 because the point at which seating wall 18 meets shoulder 20 will often be located at the innermost edge of a bore seat, such as bore seat 34, as illustrated in FIG. 3. The clamped length L will frequently be the distance between shoulder 20 and the beginning of bore threaded portion 36 because the threaded portion 26 of fastener 10 will often be inserted fully into bore threaded portion 36 of bore 30. For this specific case, L and D can be calculated from either fastener 10 or bore 30.

Figure 4:
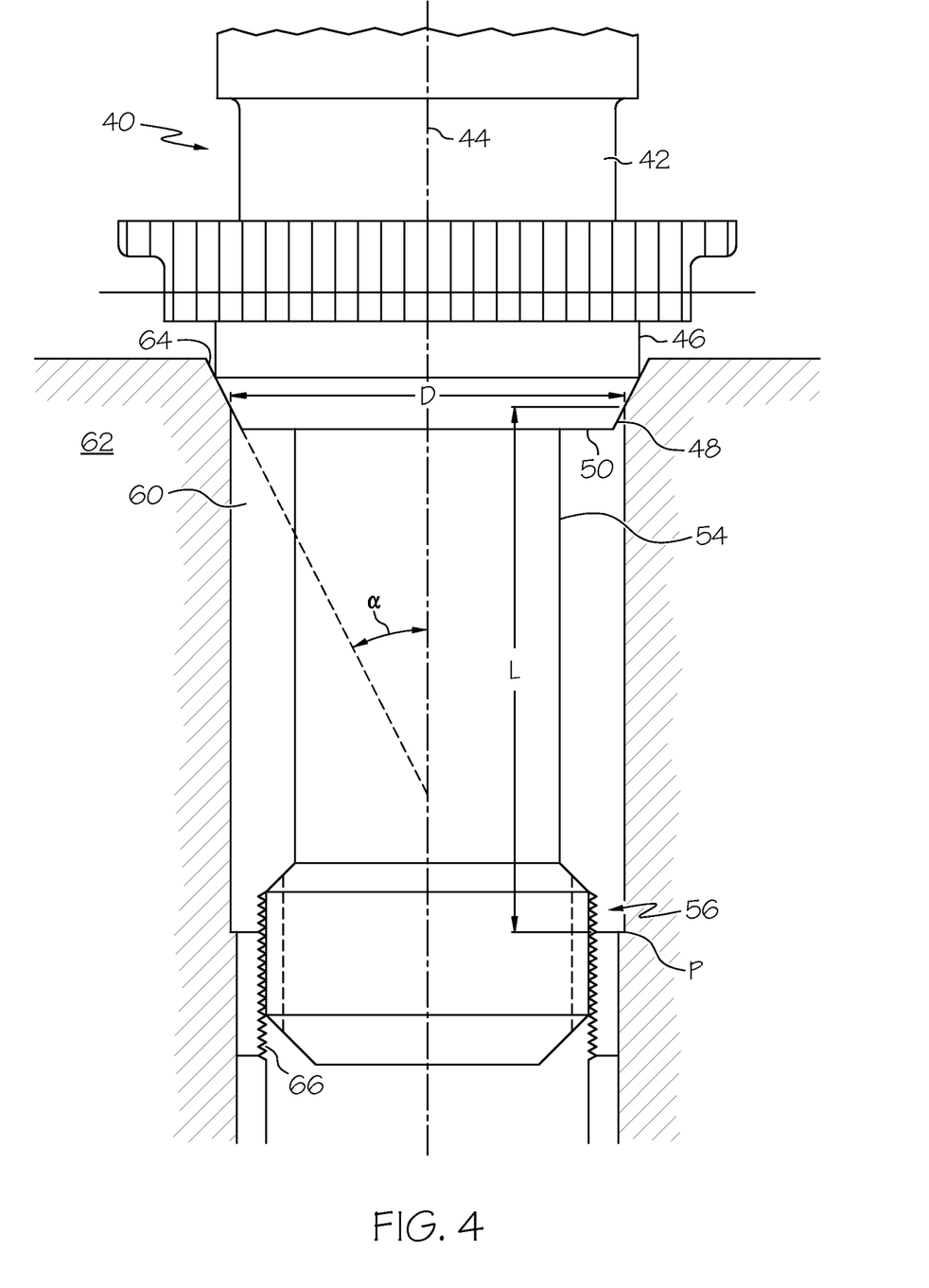
FIG. 4 is a side elevation view, partly in section, of a fastener according to an embodiment of the present invention mounted in a second bore.

However, a more general case is illustrated FIG. 4 wherein the above-mentioned conditions do not necessarily obtain. In this fastener system, a fastener 40 includes a main body portion 42, a centerline 44, a sidewall 46, and an angled seating wall 48 extending from sidewall 46 to a shoulder 50 and making an angle $\alpha$ of about 20 degrees with centerline 44. A neck portion 54 having a diameter less than the diameter of main body portion 42 extends from shoulder 50 and terminates at a threaded end portion 56. Fastener 40 is shown positioned in a bore 60 in a block 62. Bore 60 includes an angled seat 64 and a threaded portion 66.

Fastener 40 is designed such that a portion of seating wall 48 may extend into bore 60 past bore seat 64 and/or such that fastener end portion 56 does not fully overlap bore threaded portion 66. Both of these conditions are shown in FIG. 4 for illustration purposes; however, both conditions will not always occur together. In this situation, the seating diameter D is different than the diameter of the seating surface at the fitting shoulder 50 and the clamped length L of the fitting is not measured from the end of threaded end portion 56 that is closest to shoulder 50 because proximal contact point P is not located at the end of threaded end portion 56.

It has been found that forming a fastener with a certain relationship between $\alpha$, D and L will cause the preload on fastener 10 to be substantially independent of temperature. Specifically, when $\alpha$ is equal to arctan (D/(2L)), the preload should remain substantially constant with varying temperature. Of course, typical manufacturing tolerances may prevent the above equation from being satisfied exactly. However, even when one or more of the values $\alpha$, D and L varies, for example, by 1 to 5 percent from ideal, the temperature-based variations in preload will beneficially be reduced. This effect is independent of the materials used for the block and the fastener.

One or two of the values $\alpha$, D and L will be often be determined by design requirements or existing equipment. When two of these values are predetermined, the third value can be calculated from $\alpha$=arctan (D/(2L)). For example, $\alpha$ may be based on the equipment used to form a bore and D may be based on a required fluid carrying capacity. In such cases, it becomes relatively easy to change L by changing the length of the neck portion of the fastener. While this may sometimes require a change of the position of the threaded portion of the bore, it may also be possible to make the threaded portion of a bore longer than the threaded end of the fastener so that the fastener can be inserted in the bore over a range of positions to obtain a wide range of desired clamped lengths L. Of course, when only one of the above values is predetermined, the above equation can be solved for one of the remaining variables in terms of the third variable.

As one example, a typical value for $\alpha$ is 20 degrees. Therefore, based on the equation $\alpha$=arctan (D/(2L)), tan 20=D/(2L)

0.364=D/(2L)

0.728=D/L 1.374=L/D and 1.374D=L.

Since L is often the most practical dimension to vary, a fastener can be formed having a clamped length based on the above calculations. When varying $\alpha$ using the above formula, it should be noted that as L/D decreases, as it tends to do for larger diameter fasteners (such as AS1986 fasteners), the angle of the seating surface becomes "flatter" (a larger $\alpha$).

While it is often desirable to minimize changes in preload, it is also possible using embodiments of the present invention to ensure preload increases with temperature. First it must be determined whether the coefficient of thermal expansion of the fastener is greater than or less than that of the material that will receive the fastener. If the coefficient of thermal expansion of the fastener is less than that of the block of material, the fastener should be formed so that $\alpha > \arctan(D/(2L))$. If the coefficient of thermal expansion of the fastener is greater than that of the block of material, the fastener should be formed so that $\alpha < \arctan(D/(2L))$.

Figure 5:
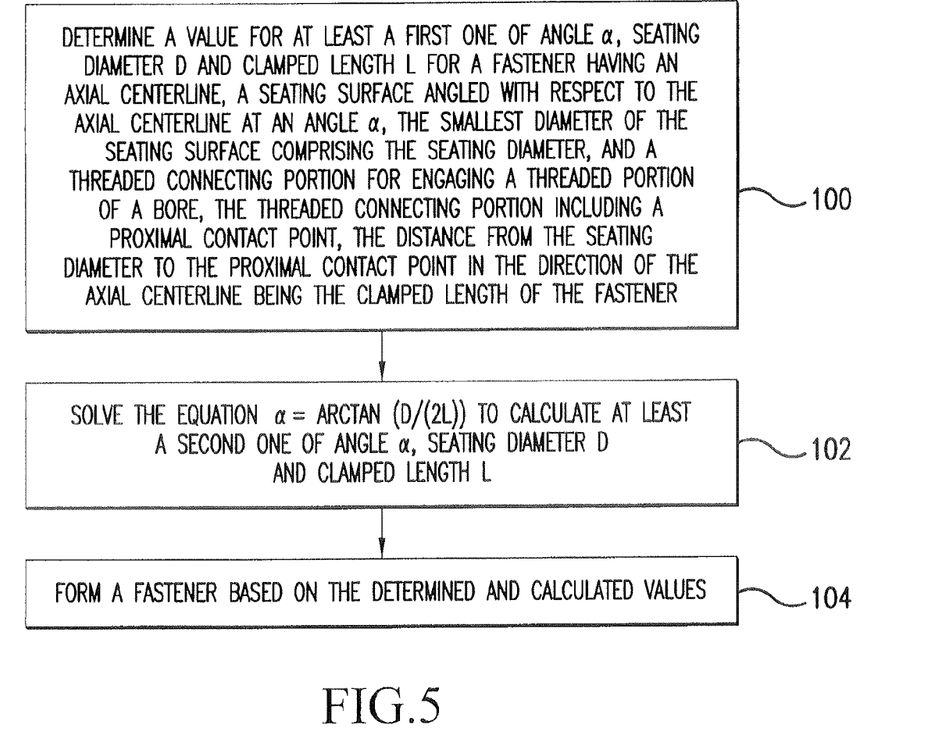
FIG. 5 is a flow chart illustrating a method of forming a fastener according to an embodiment of the present invention.

As illustrated in FIG. 5, an embodiment of the present invention comprise a method of forming a fastener having an axial centerline and a seating surface angled with respect to the axial centerline at an angle $\alpha$ and adapted to contact an angled seat of a bore. The smallest diameter of the seating surface is called the seating diameter. The fastener includes a threaded connecting portion for engaging a threaded portion of a bore, the threaded connecting portion includes a point designated a proximal contact point, and the distance from the seating diameter to the proximal contact point in the direction of the axial centerline is designated the clamped length of the fastener. The method includes a step 100 of determining a value for at least a first one of angle $\alpha$, seating diameter D and clamped length L, a step 102 of solving the equation $\alpha = \arctan(D/(2L))$ to calculate at least a second one of angle $\alpha$, seating diameter D and clamped length L, and a step 104 of forming a fastener based on the determined and calculated values.

The present invention has been described above in terms of preferred embodiments. However, modifications and additions to these embodiments will become apparent to those of ordinary skill in the art upon a reading of the foregoing description. It is intended that all such obvious variations form a part of the present invention to the extent they fall within the scope of the several claims appended hereto.

I claim:

1. A fastener system comprising:
a block comprising a bore, said bore having a diameter D, an angled seat at one end of the bore, and a threaded portion, the block having a first coefficient of thermal expansion;
a fastener having an axial centerline, a seating surface angled with respect to the axial centerline at an angle $\alpha$, said seating surface including a portion that contacts the angled seat of the block and a portion that extends into the bore, a threaded connecting portion spaced from the seating surface and threadedly engaging the threaded bore portion, and a clamped portion comprising the portion of the fastener between but not directly engaging said bore threaded portion and said bore angled seat, said clamped portion having a length L, the fastener having a second coefficient of thermal expansion,
wherein:
the length L spans from where the seating surface of the fastener first extends into the bore to the portion of the fastener that first directly engages the bore threaded portion,
$\alpha$ is equal to $\arctan(D/(2L))$ and,
the first coefficient of thermal expansion is greater than the second coefficient of thermal expansion.

2. The fastener system of claim 1, wherein said fastener includes a central bore communicating with said block bore.

3. The fastener system of claim 2, wherein said fastener seating surface is spaced from the threaded connecting portion by a neck having a diameter less than the diameter of the threaded connecting portion.

\* \* \* \* \*